United States Patent [19]

Durham, II

[11] Patent Number: 6,042,312

[45] Date of Patent: Mar. 28, 2000

[54] CARGO BAR CLAMP

[76] Inventor: Claude A. Durham, II, 10001 Roehampton Ave., Bakersfield, Calif. 93312

[21] Appl. No.: 09/275,762

[22] Filed: Mar. 24, 1999

[51] Int. Cl.[7] ...................................................... B60P 7/15
[52] U.S. Cl. ......................... 410/143; 410/121; 410/151; 410/155
[58] Field of Search ................................... 410/143–145, 410/151, 121, 155, 127, 150, 122, 129; 211/105.3; 242/354.1; 224/551, 552

[56] References Cited

U.S. PATENT DOCUMENTS

| | | | |
|---|---|---|---|
| 4,737,056 | 4/1988 | Hunt | 410/151 |
| 4,770,579 | 9/1988 | Aksamit | 410/150 |
| 4,772,165 | 9/1988 | Bartkus | 410/139 |
| 5,082,404 | 1/1992 | Stewart et al. | 410/127 |
| 5,161,762 | 11/1992 | Stewart et al. | 410/127 X |
| 5,433,566 | 7/1995 | Bradley | 410/121 |
| 5,934,850 | 8/1999 | Soumar et al. | 410/155 |
| 5,971,685 | 10/1999 | Owens | 410/151 |
| 5,988,962 | 11/1999 | Santa Cruz et al. | 410/151 |
| 5,997,228 | 12/1999 | Potter | 410/155 |

FOREIGN PATENT DOCUMENTS

| | | | |
|---|---|---|---|
| 447912 | 1/1913 | France | 224/552 |

*Primary Examiner*—Stephen T. Gordon

[57] ABSTRACT

An auxiliary cargo clamp for securing cargo inside a containing device, such as the cargo bed of a truck, having a cargo space defined by a floor, upwardly extending sidewalls and a roof. The cargo clamp comprises a brace that is attached to a preexisting cargo clamp, and includes a slot and pin for mounting to the preexisting cargo clamp, a spring loaded slide that prevents movement along the preexisting cargo clamp when force is applied, and nail securing holes pin for attachment to auxiliary load securing material.

1 Claim, 6 Drawing Sheets

CARGO BAR CLAMP

BACKGROUND OF THE INVENTION

This invention relates to cargo securing devices for vehicles and more particularly to an auxiliary clamp that attaches to a cargo clamp.

There are many devices known for securing cargo. A common problem has been the bracing of cargo in a container when the cargo does not completely fill the container. Without being properly braced, any movement of the container can cause the cargo to shift about inside the container thereby causing damage to both the cargo and container.

Often a load of cargo will include items of varying shapes and sizes. Therefore, the brace should be adjustable to effectively secure the cargo to the container regardless of the size, shape, or manner of packing these individual cargo items.

Significant problems are often encountered when transporting goods in the cargo bed of a truck. This cargo may typically include square or rectangular articles such as boxes, cylindrical articles, or relatively thin articles such as wood, mattresses, or the like. Oftentimes these articles are stacked on top of pallets of varying sizes. Most cargo trailers are designed to accommodate a plurality of pallets containing material. The trailer is loaded in such a way that two pallets of material are loaded side-by-side, with additional pallets of material running the length of the cargo bed in the same configuration.

Various conventional bracing devices have been disclosed. Virtually all are designed to prevent the load from shifting in a front-to-back direction. The majority of said prior art is designed to be positioned laterally across the inside of the vehicle, and abutting the material. However, these conventional braces have several common defects. The most significant defect being their inability to effectively brace loads from lateral movement. When positioned against two pallets of material closest to the rear of the vehicle, these conventional braces are effective in securing the material from movement in a backward direction. However, the pallets of material are kept from shifting laterally solely by the wall of the vehicle and the other pallet of material that is positioned laterally against it. When one pallet is removed, a gap then exists in the space from where the pallet was removed. The conventional bracing devices will still prevent front-to-back movement, but lateral movement can occur because of the open space left from the removal of the other pallet of material. This invention aides in the prevention of said lateral movement.

In U.S. Pat. No. 5,082,404 to Stewart et al, 1992, and U.S. Pat. No. 5,161,762 to Stewart et al, 1992, there is disclosed an adjustable brace for securing certain loads from lateral movement. However, these are designed to accommodate smaller vehicles, require a complete track system, and utilize a screw type of securing system.

BRIEF SUMMARY OF THE INVENTION

The present invention provides a cargo securing device that attaches approximately perpendicular to a standard cargo clamp. The invention is placed on the preexisting, standard cargo bar at approximately a right angle. The invention is moveable along the standard clamp and is placed against the cargo that is desired to be secured. The invention includes a spring-loaded sliding bar that, when in use, secures the invention to the preexisting cargo bar.

In use, when the cargo commences to shift laterally, said cargo immediately engages the face of the invention and causes the invention to pivot against the preexisting cargo bar. As the invention pivots, it nears closer to a right angle relative to the preexisting bar. As the invention nears perpendicular relative to the preexisting bar, the spring-loaded slide engages said preexisting bar, securing the invention to the preexisting bar and preventing further movement of the invention and the cargo.

The advantages of my invention over the prior art are many and include a device that is designed to attach to standard cargo securing devices at an approximate right angle to prevent lateral movement of the cargo. A further advantage is that my invention will accommodate a sheet of plywood, or other material, of varying sizes to be positioned between the invention and the material to be secured for additional stability of the cargo. A still further advantage is a simple spring loaded securing method and its ease of use.

The invention includes means for removing it from the preexisting bar clamp when necessary.

An object of the invention is to provide an attachment to a preexisting standard cargo clamp.

A further object of the invention is to provide an attachment to a preexisting standard cargo clamp that secures cargo from lateral movement.

A further object of the invention is to provide an attachment to a preexisting standard cargo clamp that can accommodate a sheet of plywood, or other material, of varying sizes, to be placed between the invention and the material to be secured.

A further objective of the invention is the provision that the invention, when not in use, can be removed from the preexisting standard cargo clamp and stored out of the way.

BRIEF DESCRIPTION OF THE SEVERAL VEIWS OF THE DRAWINGS

DETAILED DESCRIPTION OF THE INVENTION

Figure 1:
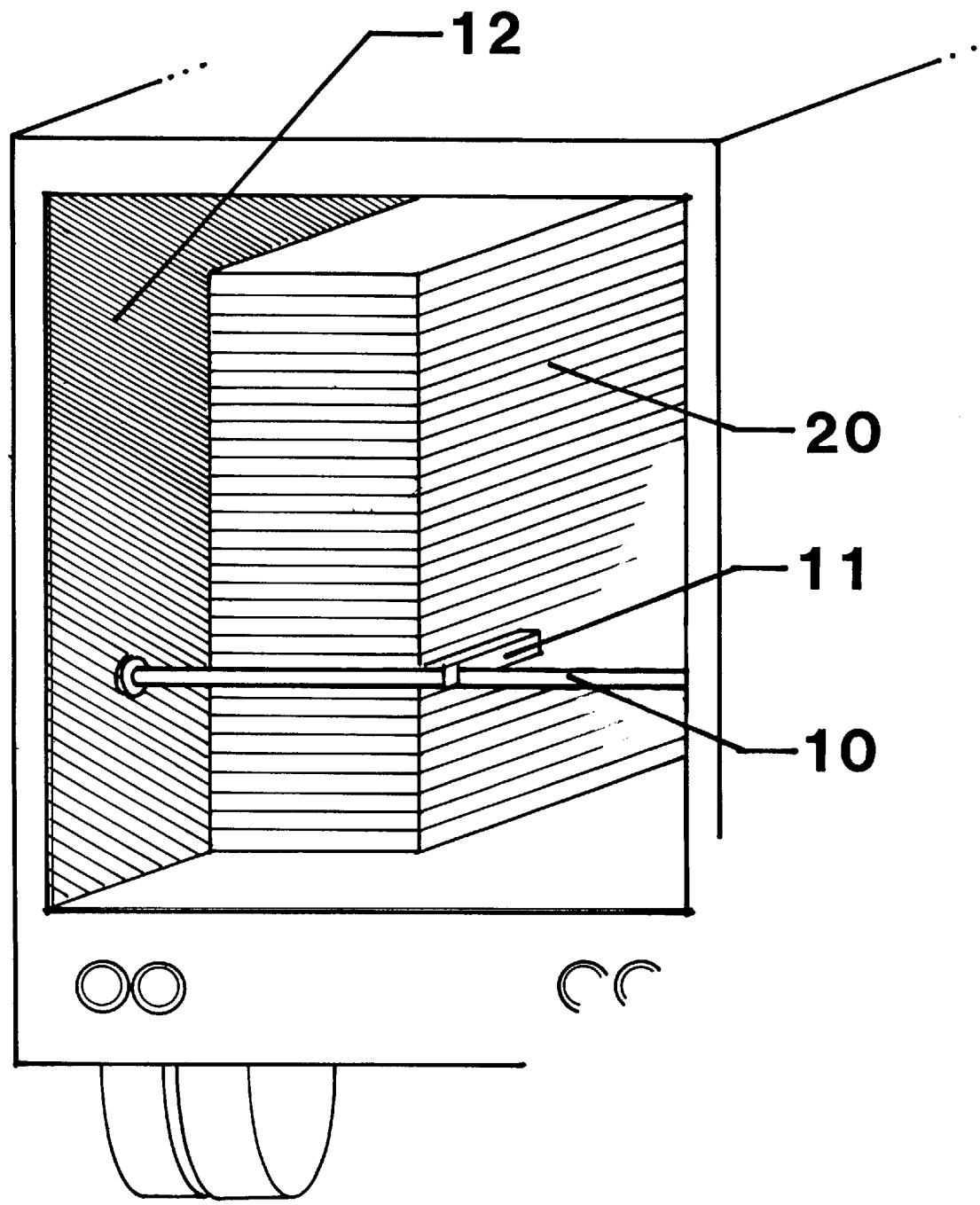
FIG. 1 is a perspective view of the invention attached to a preexisting standard cargo clamp in position against cargo.

Referring now to the drawings, wherein like reference numerals designate identical or corresponding parts throughout the several views, FIG. 1 shows the Invention (11) installed in the interior of a vehicle. The preexisting cargo bar (10) is shown in a normal position for securing material (20), secured by pressure applied against the vehicle's inside sidewalls (12). The invention (11) is shown in a working position, attached at an approximate right angle to the preexisting cargo bar (10) and against the cargo (20).

Figure 2:
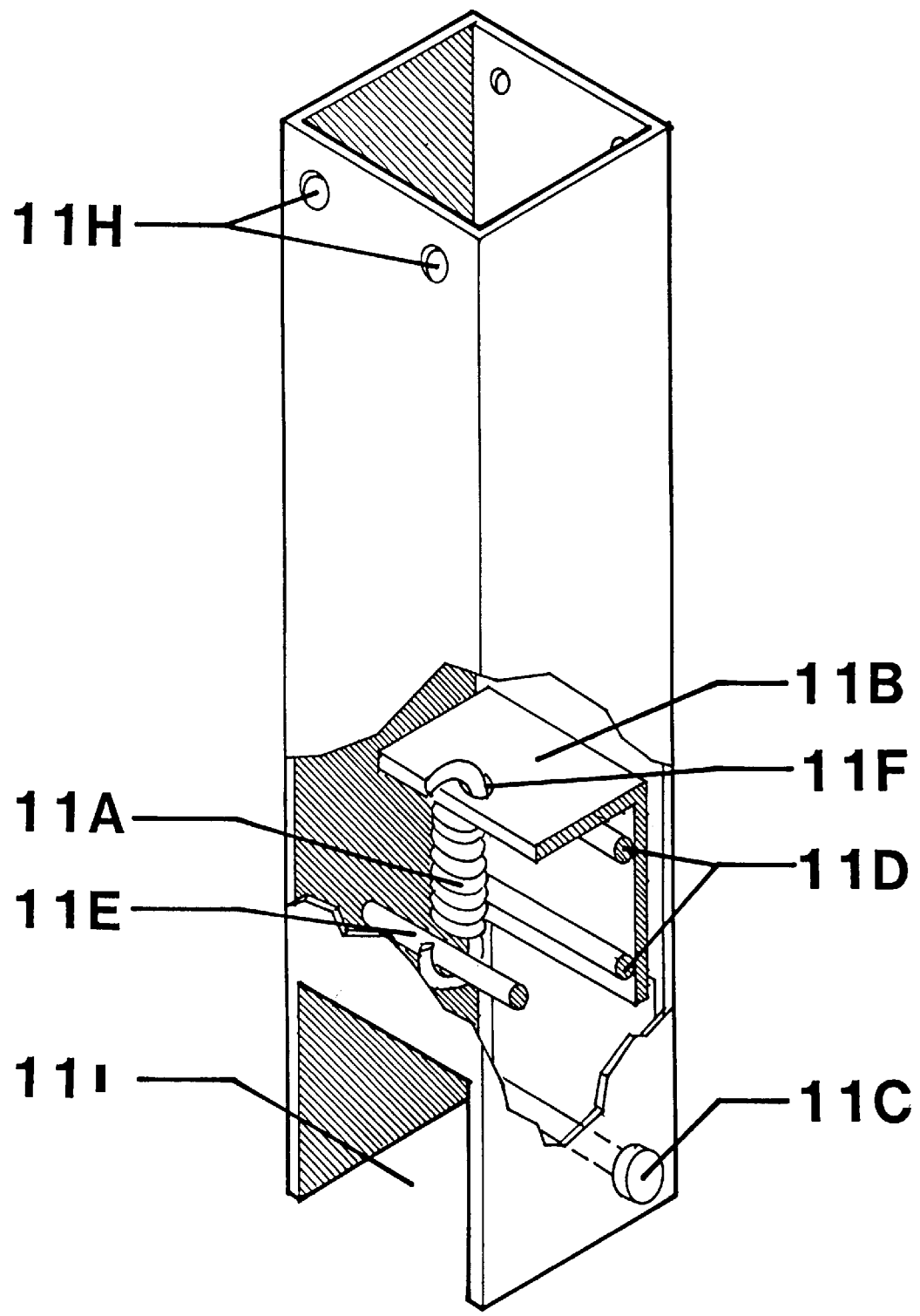
FIG. 2 is an isometric view of the invention.
Figure 3:
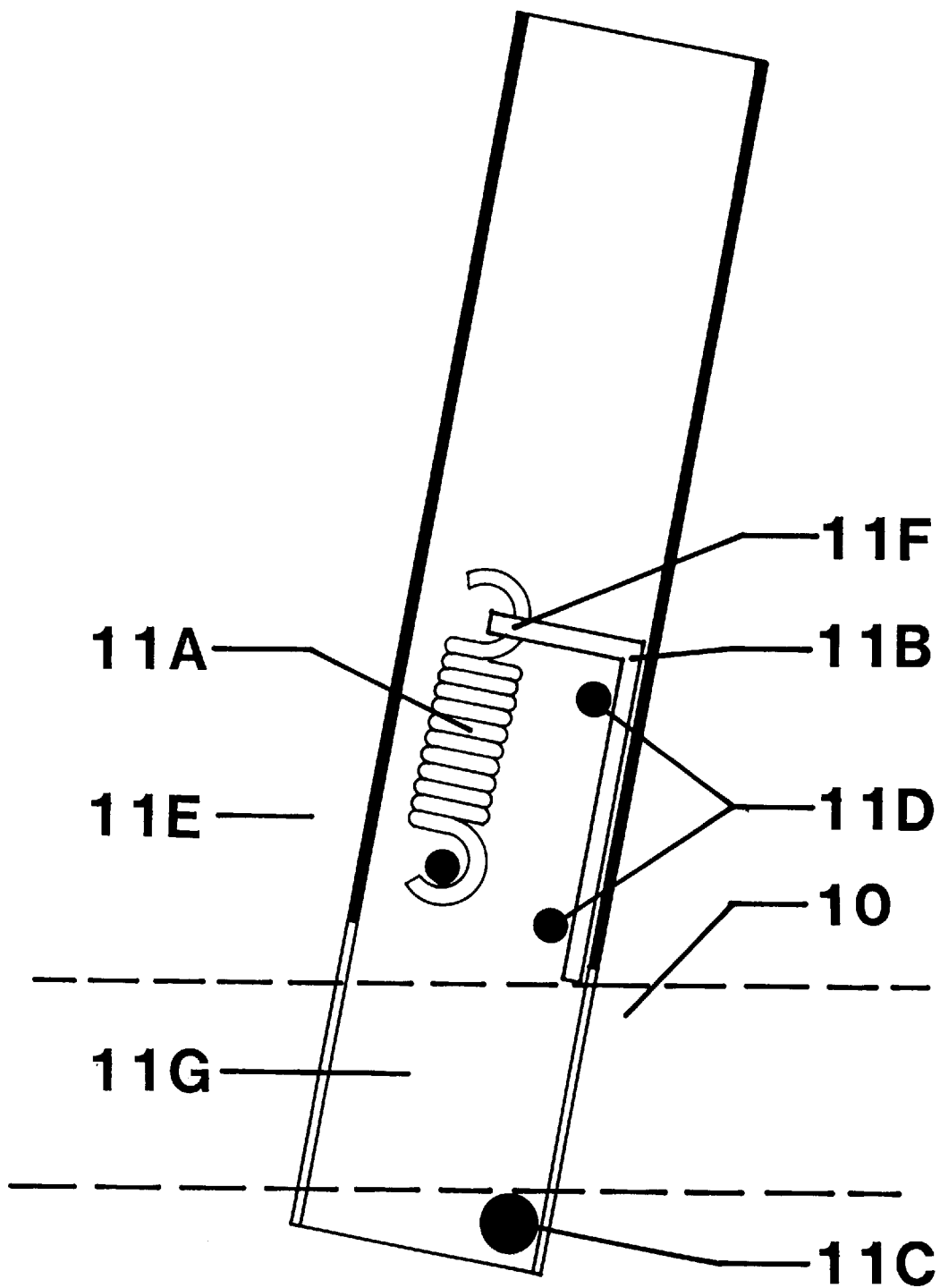
FIG. 3 is a cut away side view showing the invention in position on a preexisting cargo bar, with the spring at rest and the slide extending slightly beyond the cut-out portion of the tubing.
Figure 4:
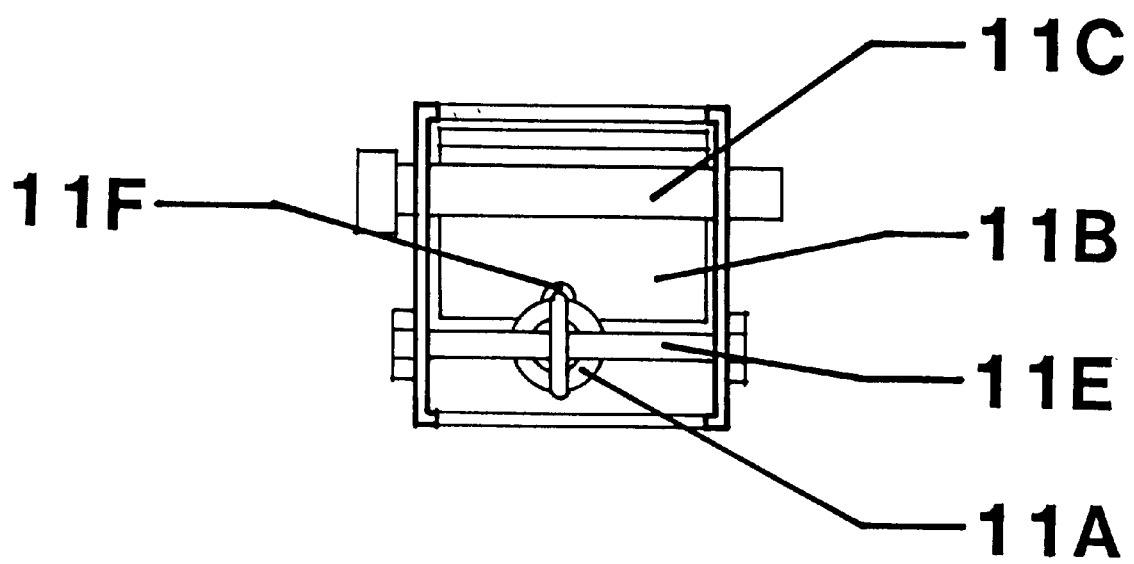
FIG. 4 is a top view of the invention showing the hitch pin and guide bolts communicating through the tubing
Figure 5:
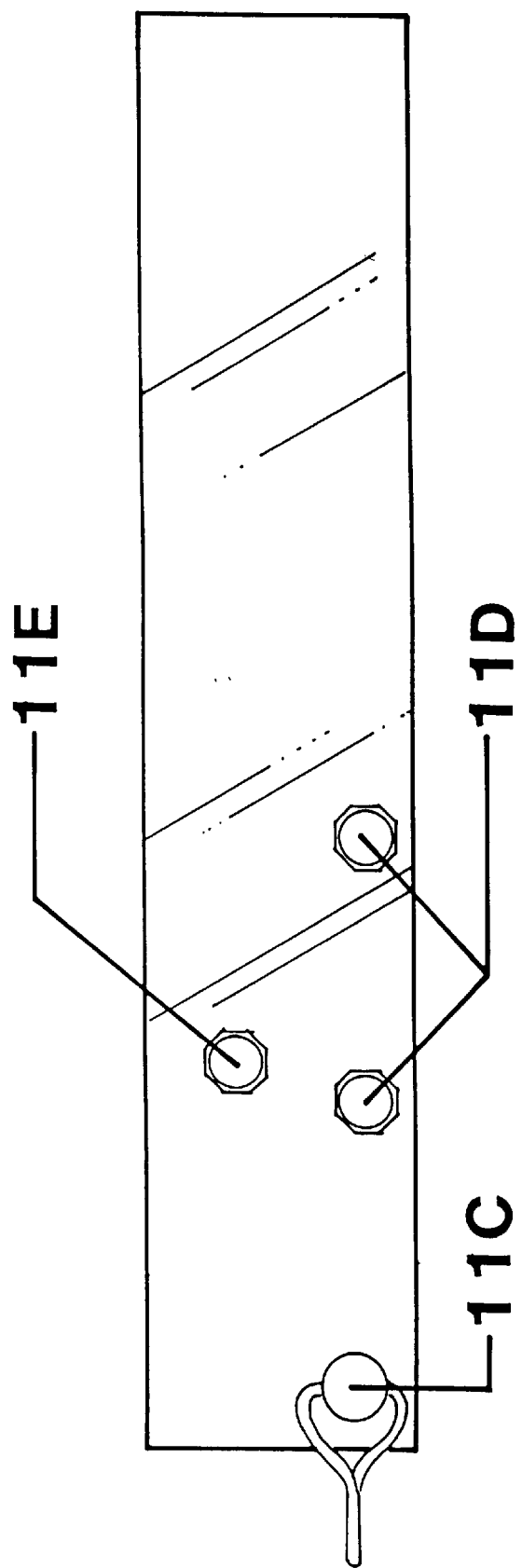
FIG. 5 is a side view of the invention showing the relative positions of the hitch pin, the guide bolts, and spring securing bolt.

As best shown in FIG. 2, the Invention comprises a square tube section (11G), of which the inside dimensions are slightly larger than standard preexisting cargo bar (10). The length of the square tube section (11G) can be of varying length. One end of the tubing section (11G) has a slot (11J) cut out between two opposite walls leaving two opposite remaining walls (11I).

Communicating through the remaining walls (11I) is a removable round-over hitch pin (11C), or other securing device. Positioned against an interior wall of the tube section (11G) is the L-shaped slide (11B), preferably constructed of metal, and the spring (11A). Communicating through the tubing section (11G) is a spring securing bolt (11E) and a plurality of slide positioning bolts (11F). The slide (11B) is positioned under the slide positioning bolts (11F) and extending slightly beyond the edge of the slot (11J) and between the remaining walls (11I). One end of the spring (11A) is positioned over the spring securing bolt (11E). The other end of the spring (11A) is positioned through a hole in the slide (11B). At the end of the tubing section (11G) opposite the end containing the remaining walls (11I) are a plurality of nail securing holes (11H).

Figure 6:
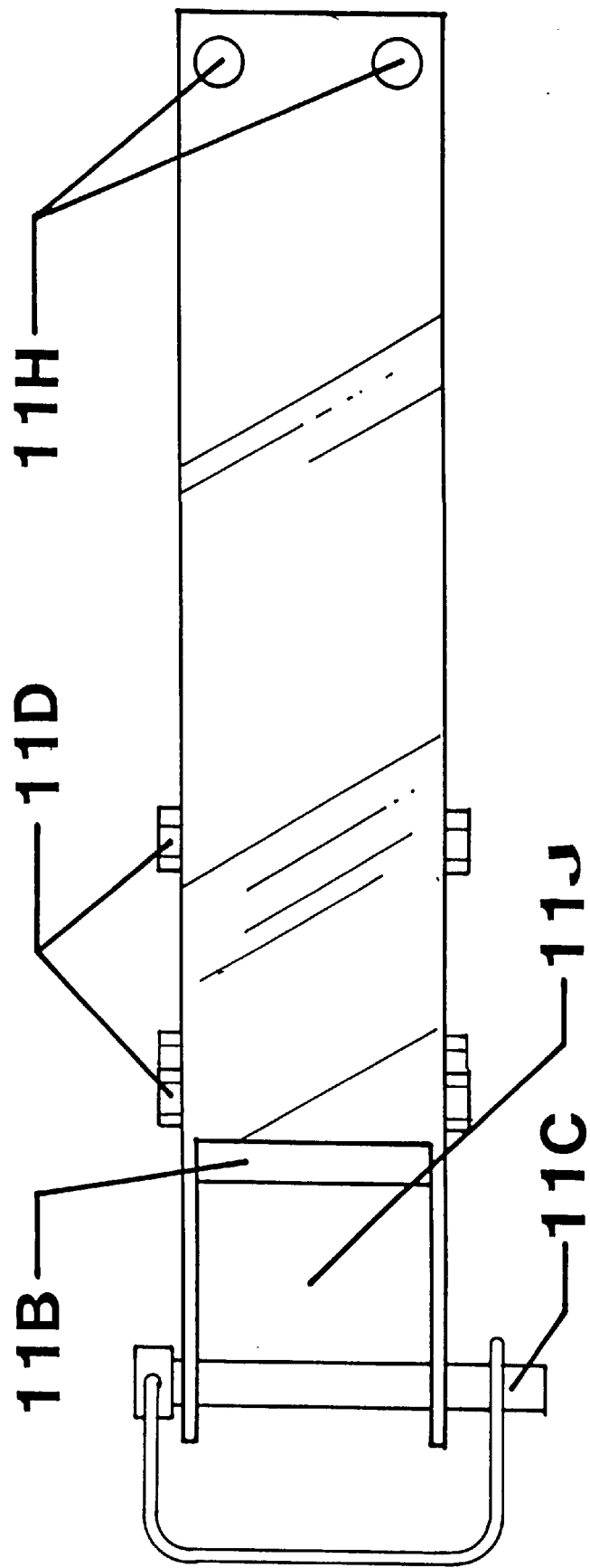
FIG. 6 is a side view perpendicular to the side view presented in FIG. 5, showing the slot cut from the tubing and the two remaining walls with the hitch pin in place communicating through the remaining walls, the slide extending slightly beyond the cut out slot, and the nail securing holes.

In use, and referring to FIG. 2 AND FIG. 6, the end of the tubing section (11B) containing the slot (11J), is positioned on the preexisting cargo bar (10) such that the preexisting cargo bar (10) is between the remaining portion of tubing walls (11I), and at not quite a right angle to the preexisting cargo bar (10). The round-over hitch pin (11C) is removed prior to installation of the Invention (11) onto the preexisting cargo bar (10). The invention (11) is deployed such that the slide (11B) side of the square tubing is placed towards the cargo (20). The Invention (11) then is held captive by the replacement of the round-over hitch pin (11C). The round-over hitch pin (11C) is then secured by various means, preferably a metal harness that inserts into the end of the pin that is extending through the remaining walls (11I). At initial installation, the Invention need not be held firmly against the cargo (20).

The invention (11) is then slid along the preexisting cargo bar (10), still at not quite a right angle, until it engages the cargo (20). At rest, the invention (11) does not necessarily apply any lateral force to the cargo (20). However, during lateral acceleration, or other motion, which causes the cargo (20) to shift in the direction of the invention (11), said cargo (20) may come into contact with the invention (11). In the event that the cargo (20) does come in contact with the invention (11), the force of that contact will force the invention (11) closer to a right angle to the preexisting cargo bar (10). As the invention (11) nears a right angle to the preexisting cargo bar (10) the portion of the slide (11B) that is extended beyond the edge of the slot (11J) makes contact with the preexisting cargo bar (10) and is held in place on the preexisting cargo bar (10) under the action of the spring (11A) acting upon the slide (11B). The slide (11B) is guided by the two slide bolts (11D).

The Invention (11) provides lateral stability to the cargo (20) in conjunction with the preexisting cargo bar (10) that provides longitudinal stability to the cargo (20). At rest, the Invention does not necessarily apply any lateral force to the cargo (20). However during lateral acceleration, or other motion that would cause the cargo (20) to shift laterally, the Invention is engaged to stabilize the cargo (20). As the cargo (20) shifts away from the truck sidewalls (12) and makes contact with the Invention, the lateral inertia of the cargo (20) causes the Invention to bind against the preexisting cargo bar (10). The binding will arrest the lateral movement of the invention on the preexisting cargo bar (10), which correspondingly, will arrest any further motion of the cargo (20), until the lateral acceleration ceases.

The invention (11) also embodies a plurality of nail securing holes (11H) at the end opposite the wall comprising THE SLOT (11J) and the remaining walls (11I), When in use, a sheet of plywood or other material can be positioned between the invention (11) and the cargo (20) and secured to the invention by nails or other securing devices communicating through the invention (11) through said nail securing holes (11H) and into said plywood or other material.

Thus it can be seen that all of the stated objectives have been achieved.

The foregoing description may make other alternative embodiments of the invention apparent to those of skill in the art. The aim of the claims is to cover all such changes and modifications that fall within the true spirit and scope of the invention.

I claim:

1. An auxiliary cargo clamp for securing a load in a cargo space comprising:

a cargo brace for attachment to a cargo bar and having a surface for pressing against a load;

said cargo brace comprising a section of tubing containing at one end an open section between two opposing walls;

a removable round-over hitch pin, with securing harness, positioned in a pre-drilled hole near said open-sectioned end of the tubing;

a moveable slide positioned under a plurality of slide guide bolts that are secured to the tubing by means of pre-drilled holes on opposing sides of the tubing;

a spring attached at one end to said slide and the other end attached to a bolt secured to the tubing by means of pre-drilled holes on opposing sides of the tubing;

a plurality of pre-drilled securing holes at the end of the tubing that is opposite the end containing the open section.

* * * * *